Oct. 16, 1962 W. H. HULTGREN 3,058,594
PLEATED PAPER FILTER
Filed June 6, 1960
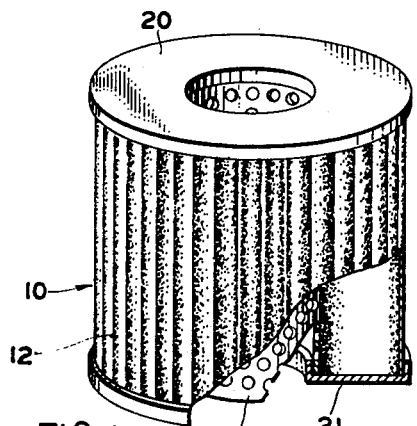
FIG. 1
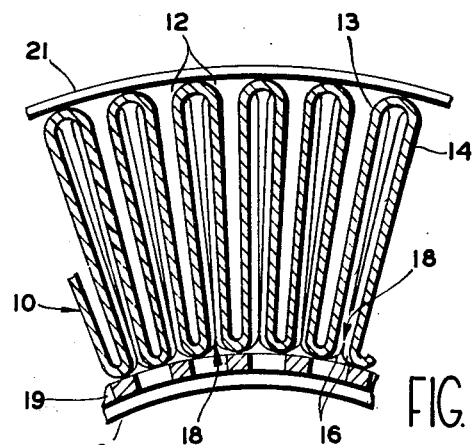
FIG. 3
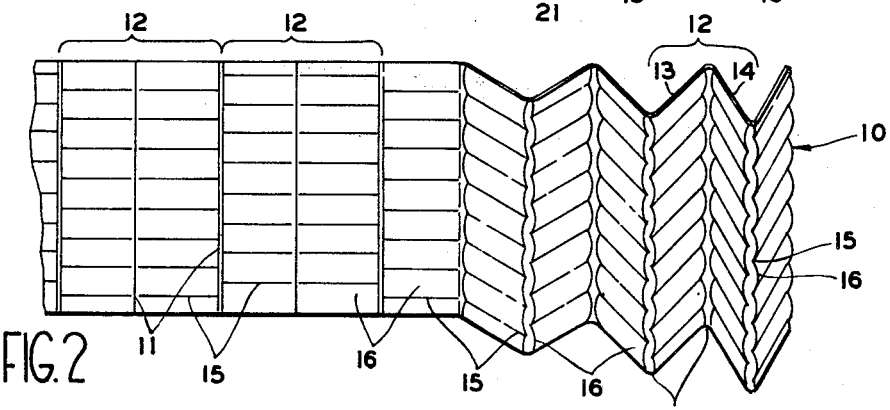
FIG. 2
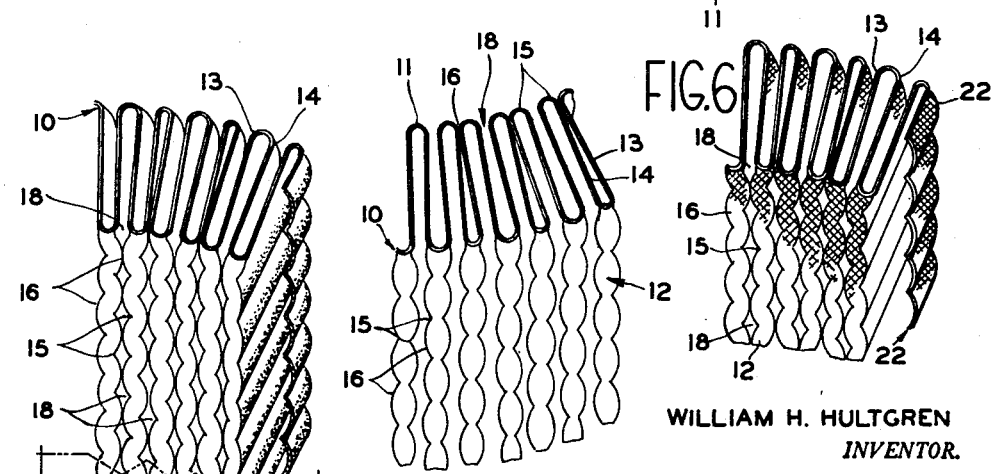
FIG. 4
FIG. 5
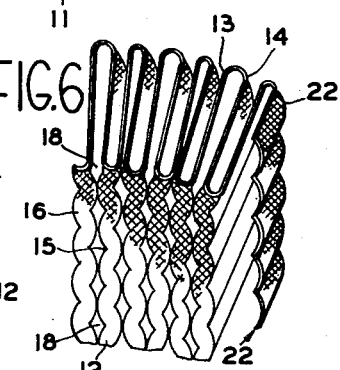
FIG. 6
WILLIAM H. HULTGREN
INVENTOR.
BY Lawrence J. Winter
ATTORNEY

United States Patent Office 3,058,594
Patented Oct. 16, 1962

3,058,594
PLEATED PAPER FILTER
William H. Hultgren, Readington, N.J., assignor to Purolator Products, Inc., Rahway, N.J., a corporation of Delaware
Filed June 6, 1960, Ser. No. 33,995
1 Claim. (Cl. 210—493)

The present invention relates to a filter, and more particularly, to a pleated filter.

Many liquid filters such as oil and fuel filters and the like, commonly consist of a continuous strip of resin impregnated paper or fine woven wire cloth that has been folded into a predetermined number of convolutions or pleats extending transversely of the longitudinal strip of filter material, after which the pleats are formed into an annulus with the pleats extending longitudinally of the annulus or extending radially outwardly from the center of the filter structure. The top and bottom edges of the pleats are generally bonded to annular paper or metal end caps or discs to which an adhesive cement has been applied and a perforated center tube is disposed within the annulus to support the pleats.

The object of forming the filter material into pleated form is to increase the filter surface or area and hence produce a more efficient filter for a given volume or space.

One problem encountered with this type of filter structure is that the adjacent pleats or convolutions sometimes are pressed or squeezed into intimate contact with each other due to the pressure of liquid on the upstream side of the folds of the pleats causing the pleats to become pressed together.

This is particularly so in the area of the pleats farther removed from the filter end caps, since they do not have the same rigid support as the edge portions of the pleats adjacent the end caps which are held in a relatively rigid position by the bonding cement.

When the inner sides of these pleats, or in other words, the downstream side of the pleats, come in contact with each other, it prevents the liquid being filtered from penetrating the pleats and discharging into the perforated center member. Thus, the pleats "pinch off," as commonly referred to in the art, and hence, liquid drainage through the filter is greatly reduced so that the advantage of increasing the area of the filter by convoluting or pleating the paper is greatly nullified.

Attempts have been made before to groove or crease the pleats to form a series of ridges and grooves running longitudinally of the continuous strip of filter material to provide a plurality of drainage passages running transversely of the longitudinally extending pleats when the strip of filter material is formed into an annulus or cylindrical configuration. A commonly used pattern is to provide a series of ridges and grooves or valleys in the pleats in which the ridges on one pleat are in alignment with the ridges on the adjacent pleat to abut or contact each other, should the pleats become pressed or pinched together, so that the valleys formed between the pleat ridges provide drainage passages when a large number of pleats are disposed in a cylindrical or annulus configuration.

The difficulty encountered with this solution to the problem is that the number of pleats that can be disposed into an annular configuration is limited because the inside diameter of the pleats is much smaller than the outside diameter and hence, the space available for packing the paper pleats around a center tube is limited by this inside diameter before the inner ends of the pleats become so packed or jammed that pinch off or complete shut off occurs because of the physical structure of the filter. With such a structure, the radial depth of the pleats is also limited because the greater this depth the greater the difference between the inside and the outside diameter of the pleat folds.

An object of the present invention is to provide a pleated filter having a drainage structure which eliminates the above problems and which permits a greater number of convolutions or pleats to be disposed in an annulus configuration, thereby increasing the filtration area of the filter with drainage passages formed in the pleats sufficient to permit filtration of the liquid passed therethrough without excessive pressure drop thereacross.

Another object of the present invention is to provide a pleated filter with drainage grooves therein in which the ridges of the pleats on the upstream side of the filter material will nest or lay within the valleys or grooves of adjacent pleats, while the ridges on the downstream side of the pleats will contact or abut the ridges of the adjacent pleats when the pleats become pressed together, to thereby provide drainage passages through the filter material and prevent pinch off.

Another object of the present invention is to provide a pleated filter with a series of ridges and grooves in which the ridges on the upstream side of the pleats nest in the grooves on the upstream side of the adjacent pleats while the ridges on the downstream side of the pleats will contact the ridges on the downstream side of the adjacent pleats, should the pleats become pressed together, to provide drainage passages for the pleats and therefore compensate for the difference between the inside and outside diameter of the pleats, and permit a greater number of pleats to be disposed in a given space while maintaining proper drainage through the pleats.

Another object of the present invention is to provide a pleated filter in which the ridges and grooves for each full convolution or pleat is disposed out of alignment with the ridges and grooves that form the adjacent full convolution or pleat.

Another object of the present invention is to provide a pleated filter wherein the ridges and grooves for a full convolution are formed out of alignment with the ridges and grooves in the adjacent full convolution and the filter material is folded so that the ridges and grooves in alignment with each other are disposed on the downstream side of the pleats.

Various other objects and advantages of the present invention will be readily understood when considered in connection with the accompanying drawings forming a part thereof, and in which:

FIG. 1 is a perspective view partly broken away, illustrating a pleated paper filter element embodying the present invention;

FIG. 2 is a view of a longitudinal length of filter paper illustrating the formation of the ridges and grooves for each full convolution out of alignment with the ridges and grooves of adjacent convolutions;

FIG. 3 is an enlarged fragmentary plan section of the pleated filter taken along the diagonal line 3—3 of FIG. 4;

FIG. 4 is a fragmentary perspective view illustrating the pleats on the downstream side of the filter paper;

FIG. 5 is a fragmentary perspective view illustrating the pleat structure on the upstream side of the filter paper; and FIG. 6 is a view similar to FIG. 4, illustrating the invention with pleated woven wire cloth material.

Referring to the drawings, the reference numeral 10 designates a continuous strip of well known resin impregnated filter paper provided with a series of transverse creases 11 therein at predetermined intervals to form longitudinally extending pleats or convolutions 12 therein with each full convolution 12 consisting of two folds or walls 13 and 14 when the paper is disposed in a cylindrical or annular configuration.

Before the strip of paper is formed into an annulus, it is first passed through well known mating rolls with circular ribs or projections thereon, which form a predetermined number of alternate grooves or valleys 15 and ridges or peaks 16 extending longitudinally of the strip of paper and extending the length of the convolutions 12, to provide drainage or flow passages for the pleats, as hereinafter described. The grooves 15 and ridges 16 in folds 13 and 14 of one single convolution are formed therein in alignment with each other, as best seen in FIG. 2, while the grooves 15 and ridges 16 in adjacent or alternate convolutions 12 are formed out of alignment with the grooves and ridges in the one convolution so that the grooves and ridges in two successive convolutions or pleats are staggered or shifted out of alignment with each other. The grooves and ridges for adjacent convolutions are preferably shifted out of alignment with respect to the next adjacent convolution by one-half the center distance between the grooves.

When the strip of paper is folded into individual pleats or convolutions, it is folded along the center crease 11 of a convolution 12 between folds 13 and 14, so that the aligned ridges 16 of a convolution abut or are in contact with each other when the pleats are tightly packed and the aligned ridges are disposed on the downstream side of the annular filter cartridge when the pleats are disposed in a cylindrical configuration, as best seen in FIG. 3. Thus, the abutment of the ridges 16 in folds 13 and 14 of a pleat provide drainage grooves or flow passages 18 therebetween on the downstream side of the pleated filter paper extending the full depth of the pleats to permit drainage of liquid into the center tube.

The staggering or shifting of the grooves 15 and ridges 16 on two adjacent convolutions permits the ridges of an adjacent convolution 12 on the upstream side of the convolutions to lay or nest in the groove or valley 15 of the adjacent convolution 12, as shown in FIG. 5, thereby decreasing the outside diameter of a cylindrical pleated filter cartridge with respect to the inside diameter of the element. This therefore permits a greater number of convolutions to be disposed around a perforated center tube within a given space without decreasing the normal drainage necessary for the filter element, and thereby eliminating pinch off of the pleats. There is not too much of a problem connected with the pleats on the upstream side of the annular filter cartridge coming in contact with each other, since the higher oil pressure on the upstream side of the cartridge will readily separate the pleats so that the oil may filter through the permeable filter paper.

After the paper has been positioned into an annulus about the perforated center tube 19 and its loose ends clamped or cemented together to form a continuous cylindrical element, the opposite edges of the pleats are cemented to annular end caps 20 and 21 and the filter element is completed.

The embodiment of the invention in FIG. 6 is substantially the same as that in FIG. 1 in structure and operation, except that the filter material 22 consists of fine mesh woven wire cloth, for example, in the range of 300 to 400 mesh.

It will be particularly noted that the present invention provides an annular resin impregnated pleated paper filter element in which the ridges and grooves embossed in a full convolution or pleat are shifted out of alignment with the corresponding ridges and grooves of adjacent convolutions, with the ridges and grooves in a single convolution disposed in alignment with each other so that the ridges abut each other on the downstream side of the convolutions, when the pleats are pressed together, while the ridges and grooves on the upstream side of the convolutions nest or lay in the valley of the preceding convolution when the pleats are pressed together, so that a compact cylindrical pleated paper filter cartridge is provided with a greater number of pleats for a given space. Thus, the present invention provides a filter element in which the filter area is increased while sufficient drainage is provided through the pleats to eliminate pinch off as commonly occurred heretofore.

Inasmuch as various changes may be made in the form, location and relative arrangement of the several parts without departing from the essential characteristics of the invention, it will be understood that the invention is not to be limited except by the scope of the appended claim.

What is claimed is:

A filter having a cylindrical configuration formed by a strip of filter material provided with a series of interspaced creases forming longitudinally extending pleats in each instance having two radially projecting walls joined together along their outer edges by one of the creases and joined with the walls of adjacent pleats along their inner edges by the creases on either side of the first named crease, each of the two walls of each pleat having radial corrugations forming radially extending ridges and valleys which as to these two walls are arranged ridge-to-ridge so that the valleys form drainage passages therebetween and as to each wall of mutually adjacent pleats are arranged ridge-to-valley and internest with the last named walls packed closely together.

References Cited in the file of this patent

UNITED STATES PATENTS

| | | |
|---|---|---|
| 2,321,985 | Briggs | June 15, 1943 |
| 2,395,449 | Briggs | Feb. 26, 1946 |
| 2,569,243 | Kovacs | Sept. 25, 1951 |
| 2,675,127 | Layte | Apr. 13, 1954 |
| 2,801,009 | Bowers | July 30, 1957 |

FOREIGN PATENTS

| | | |
|---|---|---|
| 725,066 | Great Britain | Mar. 2, 1955 |
| 727,398 | Great Britain | Mar. 30, 1955 |